US009202208B1

(12) United States Patent
Redman et al.

(10) Patent No.: US 9,202,208 B1
(45) Date of Patent: Dec. 1, 2015

(54) MUSIC INTEGRATION FOR USE WITH VIDEO EDITING SYSTEMS AND METHOD FOR AUTOMATICALLY LICENSING THE SAME

(76) Inventors: Michael Redman, Chagrin Falls, OH (US); Greg Sims, Kingston Springs, TN (US)

( * ) Notice: Subject to any disclaimer, the term of this patent is extended or adjusted under 35 U.S.C. 154(b) by 1366 days.

(21) Appl. No.: 12/780,133

(22) Filed: May 14, 2010

Related U.S. Application Data

(60) Provisional application No. 61/178,637, filed on May 15, 2009.

(51) Int. Cl.
  *H04N 5/93*  (2006.01)
  *G06Q 20/12*  (2012.01)
  *G06Q 50/18*  (2012.01)

(52) U.S. Cl.
  CPC ............ *G06Q 20/123* (2013.01); *G06Q 50/188* (2013.01)

(58) Field of Classification Search
  CPC .... G06Q 20/12; G06Q 20/123; G06Q 50/188
  USPC ......... 705/59, 50, 51; 709/231, 217; 386/278, 386/282
  See application file for complete search history.

(56) References Cited

U.S. PATENT DOCUMENTS

| | | | |
|---|---|---|---|
| 5,434,629 A | 7/1995 | Pearson et al. | |
| 5,550,584 A | 8/1996 | Yamada | |
| 5,693,902 A | 12/1997 | Hufford et al. | |
| 5,765,152 A * | 6/1998 | Erickson | 1/1 |
| 5,812,704 A | 9/1998 | Pearson et al. | |
| 5,848,189 A | 12/1998 | Pearson et al. | |
| 5,877,445 A | 3/1999 | Hufford et al. | |
| 6,311,214 B1 * | 10/2001 | Rhoads | 709/217 |
| 6,591,012 B1 | 7/2003 | Fujioka | |
| 7,099,849 B1 * | 8/2006 | Reeder et al. | 705/59 |
| 7,778,929 B2 * | 8/2010 | Corbett | 705/59 |
| 2002/0042834 A1 * | 4/2002 | Kremens et al. | 709/231 |
| 2002/0152095 A1 * | 10/2002 | Jordon | 705/1 |
| 2007/0046512 A1 | 3/2007 | Tabuchi | |
| 2007/0243515 A1 | 10/2007 | Hufford | |
| 2008/0147558 A1 * | 6/2008 | Kraus | 705/59 |
| 2008/0307310 A1 * | 12/2008 | Segal et al. | 715/723 |
| 2008/0313226 A1 * | 12/2008 | Bowden et al. | 707/104.1 |

\* cited by examiner

*Primary Examiner* — David Harvey
(74) *Attorney, Agent, or Firm* — John D Gugliotta

(57) ABSTRACT

A real-time music request system is provided for use with editing tools for the editing of video productions. The system automates the request for licensable music, provide a mechanism for submitting fulfillment, and filters and screens for relevancy prior to proving submissions to the request.

7 Claims, 12 Drawing Sheets

FIG. 5

On-line Request Form — 50

52 →

Content Type:
(Music/Video/SFX/Photo)

When needed:

Original/Copy:

Detailed description of
needs/requirements:

Style:
Mood:
Other:

Budget:
Contact information:

Step 1

Step 2

Step 3

Step 4

← 112

MUSIC INTEGRATION FOR USE WITH VIDEO EDITING SYSTEMS AND METHOD FOR AUTOMATICALLY LICENSING THE SAME

CROSS-REFERENCE TO RELATED APPLICATION

The present application claims benefit of U.S. Provisional Application 61/178,637, filed on May 15, 2009 and incorporated by reference as if fully rewritten herein.

BACKGROUND OF THE INVENTION

1. Field of the Invention

The present invention generally relates to commercial video and audio editing tools for the editing of video and audio productions and, more specifically, to a real-time music request system for use with the same.

2. Description of the Related Art

Video and/or audio editing software is application software which handles the editing of video/audio sequences on a computer. In the simplest case the video is stored as JPEG image files in a directory. The software typically shows one image on a large area on the screen and a view of the directory. To handle many files in the directory, it is possible to zoom out, so that a single file only covers one pixel-line in the editor, or even less, for rough cutting. A play button lets the software automatically advance to the next image, thus playing the video.

Multiple files at once can be selected for any such operation. In this respect it is very similar to slide show editing software. Like slide show editing software comes with a lot of image file format decoders video editing software comes with a lot of video codecs. Video editing software generally also allows for some limited editing of the audio clips which accompany the video, or at least the ability to sync the audio with the video.

Non-linear video and audio editing systems (NLE's) currently exist for accessing source material to input digital or analog audio and video as well as software for editing the inputted audio and video. In such systems, video and sound (e.g., for film and television production) are digitized, or otherwise digital video is imported into the computer for storage on a hard disk or other storage media. Subsequently, the digital media can be manipulated. In the normal flow of the creative process, various editing tasks need to be performed on the imported video before it is saved, exported to another medium, or encoded for transfer to other storage media, e.g., a CD or DVD. However, because the audio designer and video editor often collaborate, it is generally the case that many editors can work simultaneously on the same project and the logistic of such collaboration may at times interfere with the creative work flow of the overall project. For example, in the world of television show production, documentaries and feature films, music often needs to be designed and added to the system while editors edit those files, or tweak the sound for finished parts of the musical cues or scores to correspond with the storyline.

Commercial NLE applications are designed for broadcast and post-production environments, especially those with newer, tapeless forms of video recording and storage. Offering real-time, multi-track, mixed-format editing, compositing, chroma keying, titling, and timeline output capabilities, they usually provide a user interface to sound, music and SFX files, but are not capable of requesting such licensable content, nor do they facilitate such licensing.

A search of the prior art did not disclose any patents that read directly on the claims of the instant invention; however, the following references were considered related.

U.S. Patent Publication No. US2007/0046512, published in the name of Tabuchi, describes a data conversion system that connects to digital video and analog video equipment that allows for capturing and outputting analog video from any FireWire-equipped notebook and desktop computer. Essentially a converter that allows for analog-to-DV and DV-to-analog conversion, this reference allows conversion of analog audio signals only in analog to digital audio and video synchronization. By connecting analog and digital video cameras, decks and editing systems, etc. the system is intended to be used with Windows and Mac OS video editing systems.

U.S. Patent Publication No. US2006/0184673, published in the name of Liebman, describes a method and computer program for accessing digital media files stored in a media storage server.

U.S. Pat. No. 5,550,584, issued in the name of Yamada, describes a communication system for integrating the control and communication of a number of remotely connected video monitoring cameras, and controlling the image date flow therefrom.

U.S. Pat. No. 5,434,629, issued in the name of Pearson et al., describes a real time processing system for transferring video data along a video data bus.

U.S. Pat. No. 5,812,704, also issued in the name of Pearson et al., further describes a system of synchronizing such video data and outputting it selectively.

U.S. Pat. No. 5,848,189, also issued in the name of Pearson et al, describes a method and system for comparing and altering such acquired video data and images.

U.S. Pat. No. 6,591,0125, issued in the name of Fujioka, describes a data storage and reproduction method that acquires video signals, compresses them and converts them from digital to analog signals, and then encodes them to disk or data storage and decodes them from disk or data storage.

U.S. Patent Publication No. US2007/0243515, published in the name of Hufford, describes a "mood" controller for editing the audio output of a digital audio track.

And, U.S. Pat. No. 5,693,902 and U.S. Pat. No. 5,877,445, issued in the name of Hufford et al., both describe an audio block sequence compiler for selecting a plurality of audio blocks to generate a sequence corresponding to user-selected requirements.

While these and various other commercial video and audio editing tools exist for the editing of video and audio productions, none of these specifically deal with requesting or acquiring the necessary licensable audio (or video) in real-time or otherwise, and rely essentially on royalty-free content, or conventional human intervention to acquire or review those necessary tracks needed before editing or production can occur. Consequently, a need exists for a method of automating the process of creating and fulfilling a request for licensable commercial music, as well as an automated music licensing system.

SUMMARY OF THE INVENTION

It is therefore an object of the present invention to provide a music request system that allows a user of an audio or video editing application to obtain, screen and manage and license for commercial use musical content for use therewith.

It is a feature of the present invention to provide such a system capable of being launched from within a hardware based local software audio or video edit application and return obtained, screened and managed audio files directly into the workflow of the user platform.

Briefly described according to the preferred embodiment of the present invention, a method is provided for automating the process of creating and fulfilling a request for licensable commercial music. When requests for licensable music are fulfilled, a music licensing and integration system is launched from within a hardware based local software Audio or Video Edit application and returns the audio files directly into the workflow of the user platform. The system allows the user to search, audition, manage, license, purchase and export/download as will be described in greater detail below.

In accordance with a preferred embodiment, a system is implemented that removes the need to work outside the host program, thus significantly improving the workflow of the host program.

Another preferred embodiment of the present invention is that it provides a direct integration of a web based musiclsfx licensing system for commercial use.

An advantage of the present invention is that it is launched from within a local computer based professional audio or video editing software through a secure web browser.

Other advantages of the present invention is that the user can search for music, add to the auto created project, choose a licensed usage (Film, TV, DVD for Sale, Advertising, etc) which will automatically price the music based upon the type of usage, and purchase a license and download or transfer the licensed music to their desktop, to the media folder (supplied by the host program) or directly into a media bin within the host program.

Further, a preferred embodiment of the present invention can pass project specific information from the host program to the secure browser including, but not limited to, project title, user information, and media file paths.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5 is the entry screen for the automated music request system;

FIG. 9 is the submission screen;

FIG. 10 is a human filter interface for filtering request specific submissions;

FIG. 12 is the procurement (purchase/license) screen.

DESCRIPTION OF THE PREFERRED EMBODIMENTS

In order to describe the complete relationship of the invention, it is essential that some description be given to the manner and practice of functional utility and description of commercially available video editing software, also known as Non Linear Editing (NLE), or similar application software which handles the editing of video sequences on a computer. NLE systems replace traditional flatbed celluloid film editing tools and analogue video tape-to-tape machines. NLE software is typically based on a timeline interface paradigm where sections of moving image video recordings, known as clips, are laid out in sequence and played back. Once a project is complete the NLE system can then be used to export to movie in a variety of formats in context which may range from broadcast tape formats to compressed formats for the internet, DVD and mobile devices.

It should be appreciated that the following definitions are used throughout this application and for the purposes of the present invention, the use of various digital NLE systems are anticipated in conjunction herewith. Such systems that are currently generally available include: Proprietary Adobe Premiere/Premiere Pro; Adobe Premiere Elements; Avid Xpress Pro Studio HD; Avid Liquid; Avid Media Composer; Dayang Montage Extreme; Cinestream; Edius; Final Cut Express; Final Cut Pro/Studio; Free DV; CyberLink PowerDirector; FORscene; iMovie; MainActor; Media 100; Mpeg Video Wizard; Mpeg Video Wizard DVD; Pinnacle Studio Media-Suite; Pinnacle Studio; MoviePlus; Sony Vegas; Ulead MediaStudio Pro; Ulead VideoStudio Plus; VideoReDo Plus; Windows Movie Maker; and MAGIX Movie Edit Pro. The best mode for carrying out the invention is presented in terms of its preferred embodiment is intended to be used in conjunction with such a system, as herein depicted within the Figures.

1. Detailed Description of the Figures

Figure 1:
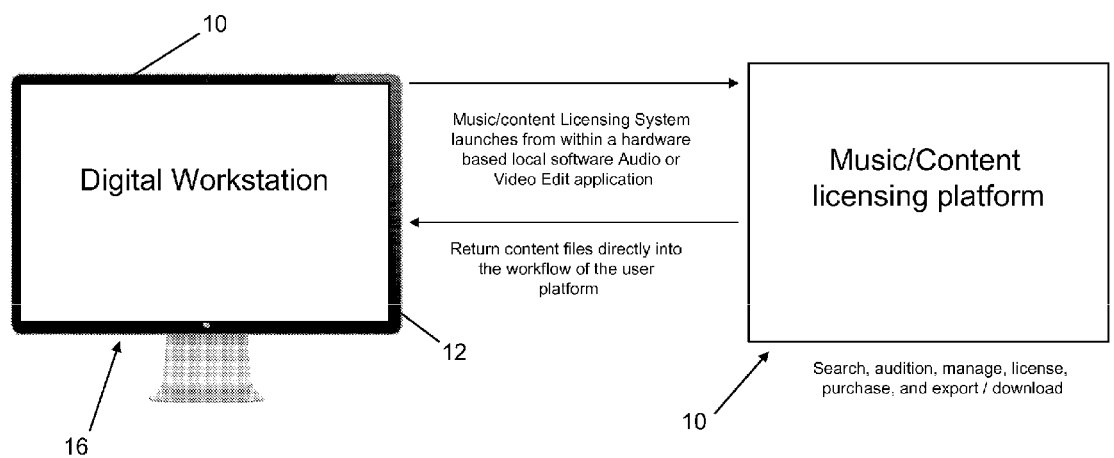
FIG. 1 is a schematic showing music integration for use with video editing systems and method for automatically licensing according to the preferred embodiment of the present invention.

Referring now to FIG. 1, a music licensing and integration system 10 is shown for use with video and/or audio editing systems 12. For purposes of the present invention, its implementation with video and/or audio editing systems is described; however, to a person having ordinary skill in the relevant art, in light of the present teachings, it would subsequently appear obvious that sound effects, film footage, photo stills, or similar licensable content could easily be included into the present system both from the request engine and the basic licensing system standpoint, and such an alteration or substitution should therefore be viewed as an equivalent for all purposes herein. The music licensing and integration system 10 is launched from an independent web browser or from within a hardware based local software Audio or Video Edit application 16, and returns the audio files to the user or directly into the workflow of the user platform. The system 10 will allow the user to search, audition, manage, license, purchase and export/download as will be described in greater detail below. Because the system 10 is intended to be used in direct conjunction with an otherwise existing audio or video edit system 12 such as a commercially available NLE system, its functional equivalent or the like, it is anticipated that the placement, look and interaction of the operating screens of the present system would be models or branded to allow for similarity of operational feel, thus providing an immediate familiarity to the user such as to further implement the goal of significantly improving the workflow of the host program. As such, while the exemplar implementation view in the figures below are shown being implemented in conjunction with Canopus Edius and Apple's Final Cut Pro existing video edit systems, it should be clear to a person having ordinarily skill in the relevant art after being exposed to the present teachings that such equivalent systems could be implemented in conjunction with any similar software capable of manipulating a broad array of digital media.

Figure 2:
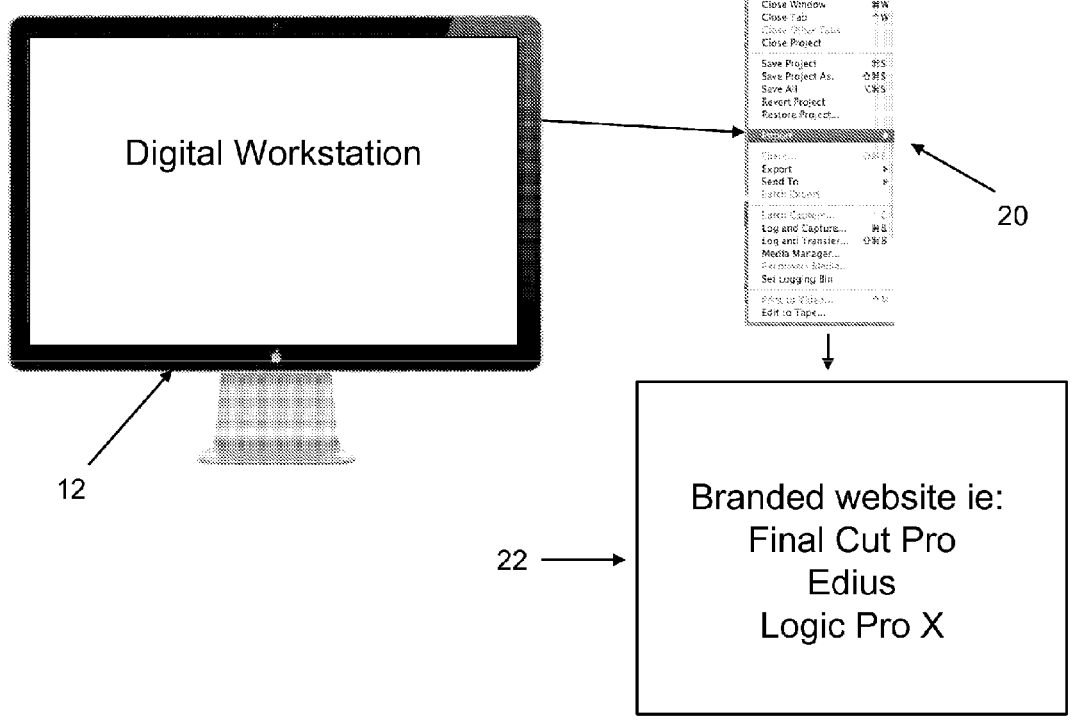
FIG. 2 is the launching screen for music integration for use with video editing systems.
Figure 3:
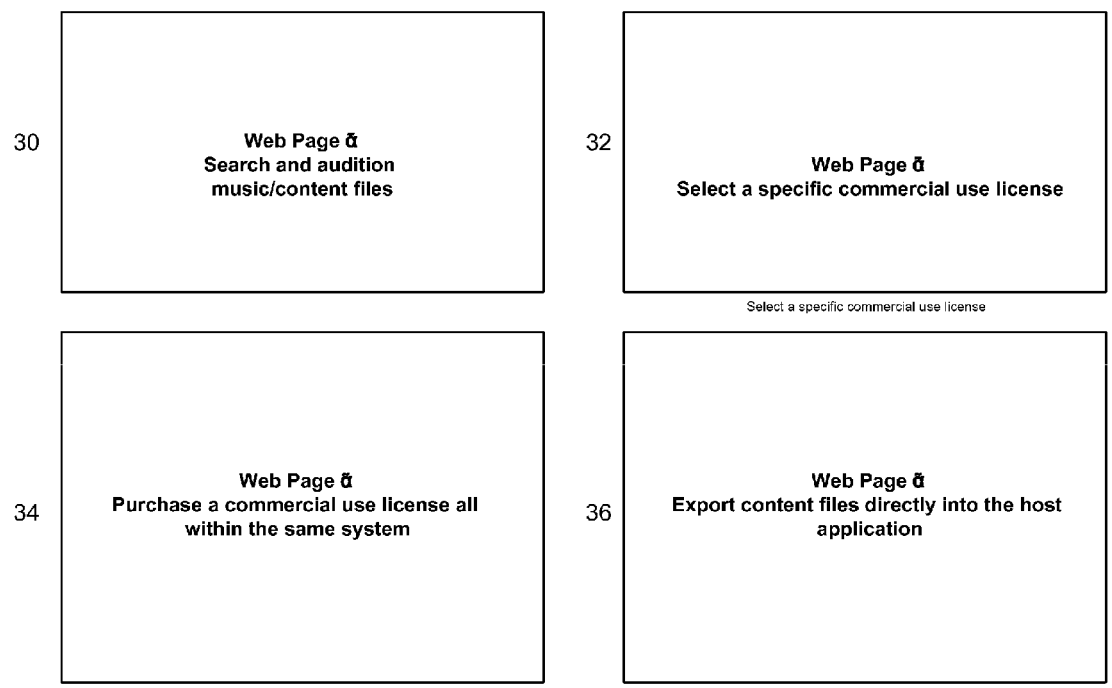
FIG. 3 the search, editing and playing screens.

Referring now to FIG. 2, an audio or video editing application 10 is shown. A private label branded web browser 22 is launched from this host application 12 from a first menu 20. As shown in conjunction with FIG. 3, this web browser 22 allows the user to perform several functions, including:

Searching and playing music and SFX files 30;
Selecting a specific commercial use license 32;
Purchasing a commercial use license within the same system 34; and
Exporting files 36 directly into the host program 12.

Figure 4:
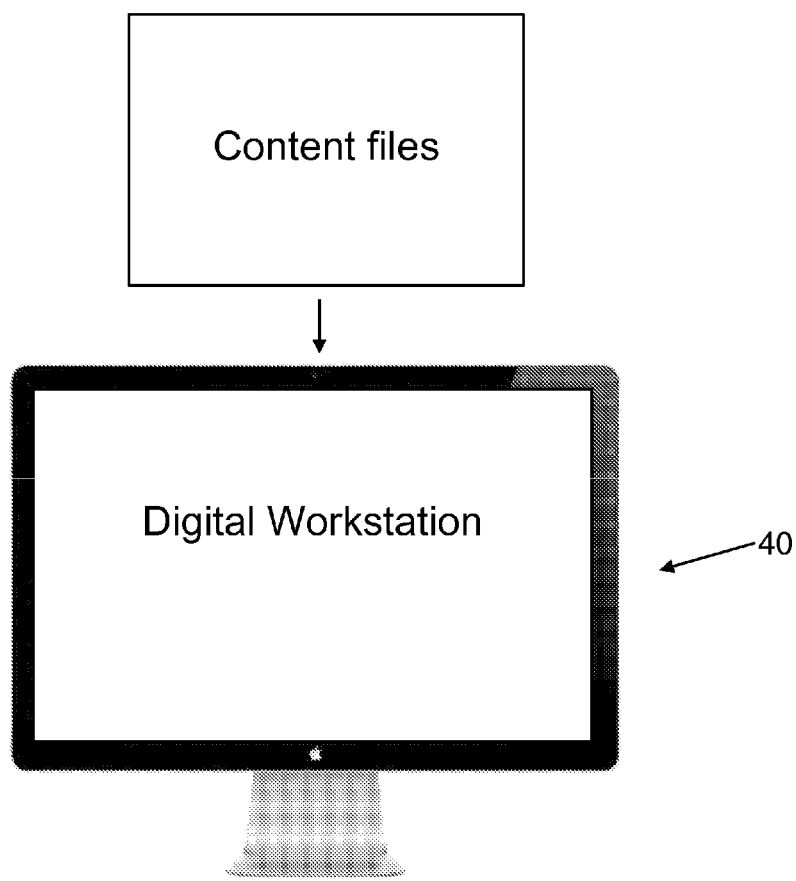
FIG. 4 is the completion screen where the retrieved music is automatically inserted into the users session.

Upon completion of licensing, as shown in FIG. 4, the music is automatically inserted directly into a media bin within the host program and does so within the creative workflow. The user can also download or transfer the licensed music to their desktop 40, or zip and email the licensed music to a third party.

2. Operation of the Preferred Embodiment

To use the present invention as shown in reference to FIG. 5-12, an automated music request system is shown and described in conjunction with the preferred embodiment of the present invention. Such a system automates the process of creating and fulfilling a request for licensable music by:

1. Placing the request through the present system;
2. Broadcasting this request through a network of preselected suppliers of commercial music; and
3. Processing and filtering the responses received to match those tracks most closely meeting the request to allow for review and ultimately commercial licensing.

Figure 6:
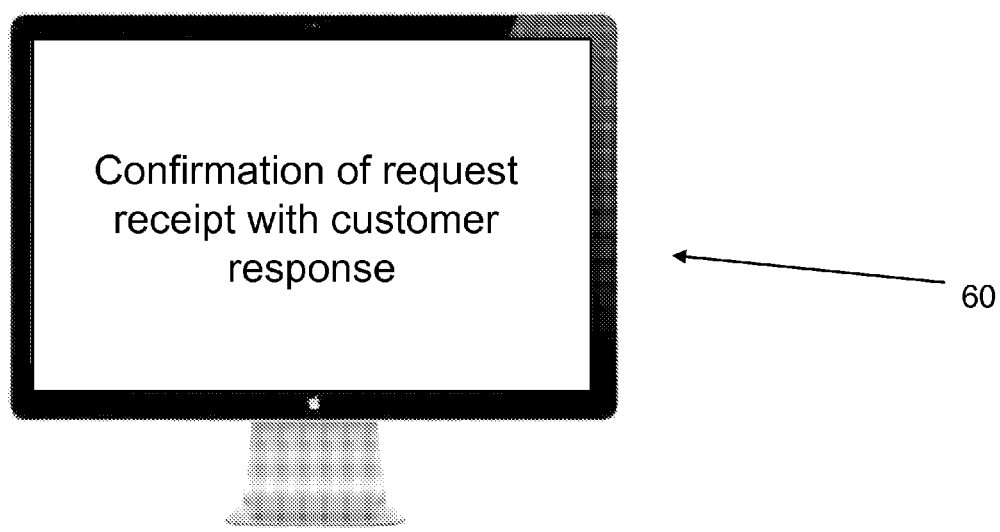
FIG. 6 is the request description screen.
Figure 7:
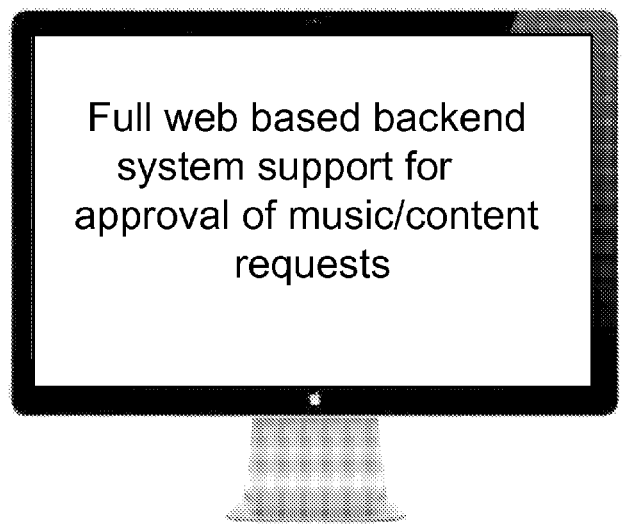
FIG. 7 is the confirmation screen.
Figure 8:
FIG. 8 is the notification screen.
Figure 9:
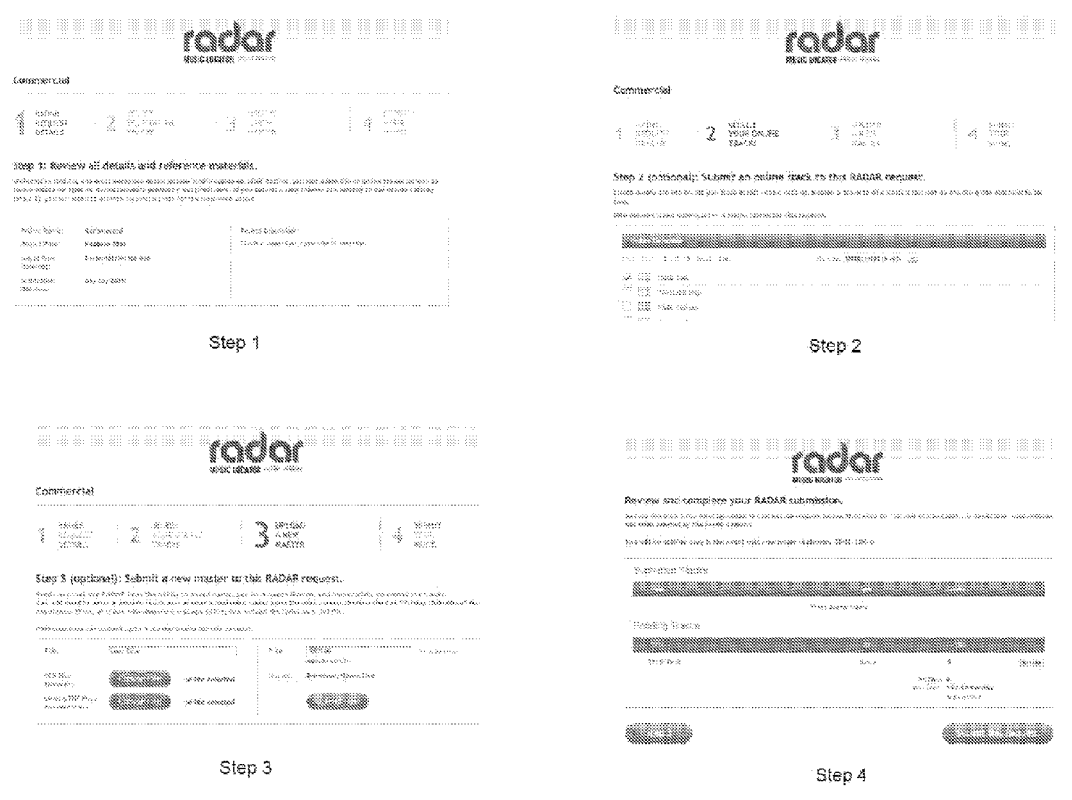
Figure 10:
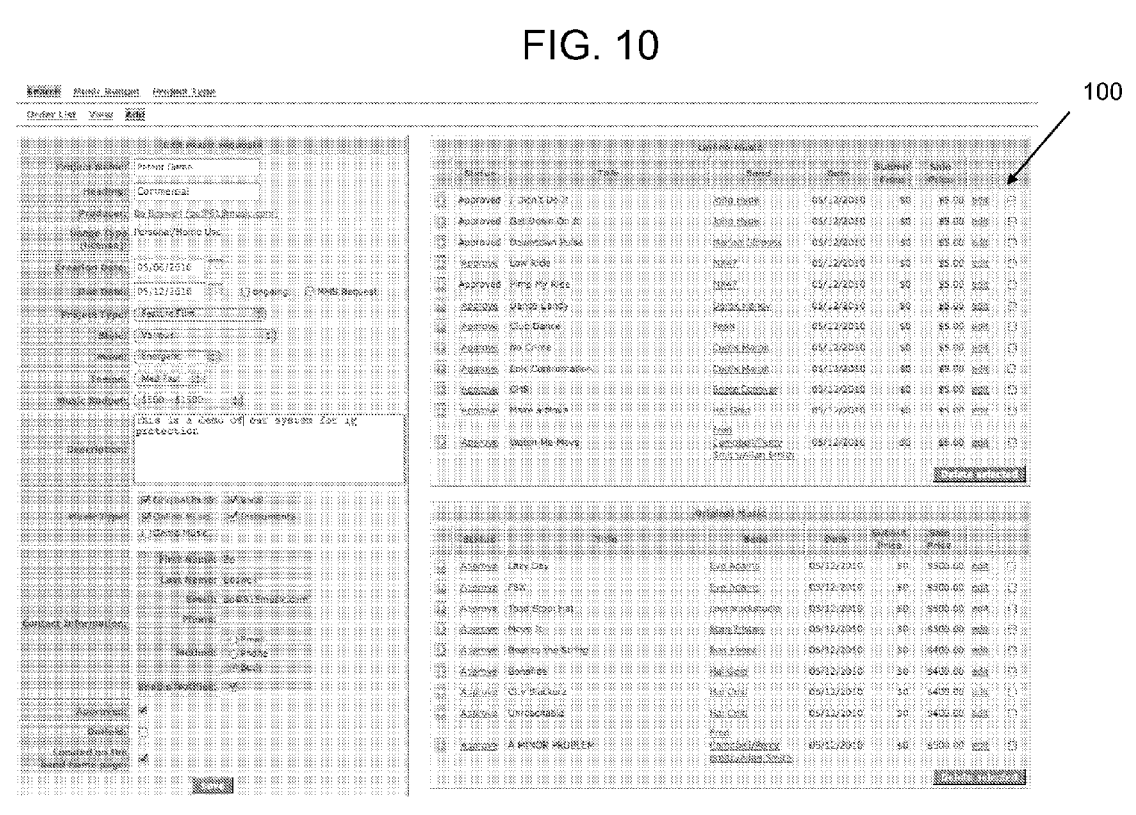

Referring to FIG. 5, the first step of placing a request is shown where a user will fill out an on-line form 50 with a detailed description of the music they are looking for 52, including the type of usage. As shown in FIG. 6, in the next step the user receives confirmation 60 that their request has been received by the system. As shown in FIG. 7, the systems administration receives a notification 70 that the request has been submitted and approves the request 72. As shown in FIG. 8, a notification is sent to multiple groups 80 of composers, record labels, publishers, and artists. Subsequently, as shown in FIG. 9, record labels, publishing companies, independent artist and composer then submit music to the specific request through a web portal. As shown in FIG. 10, music is sorted in a queue 100 in the administration area of the system for the specific music request. The administrator will then filter the music for relevancy and approve or decline a submission.

Figure 11:
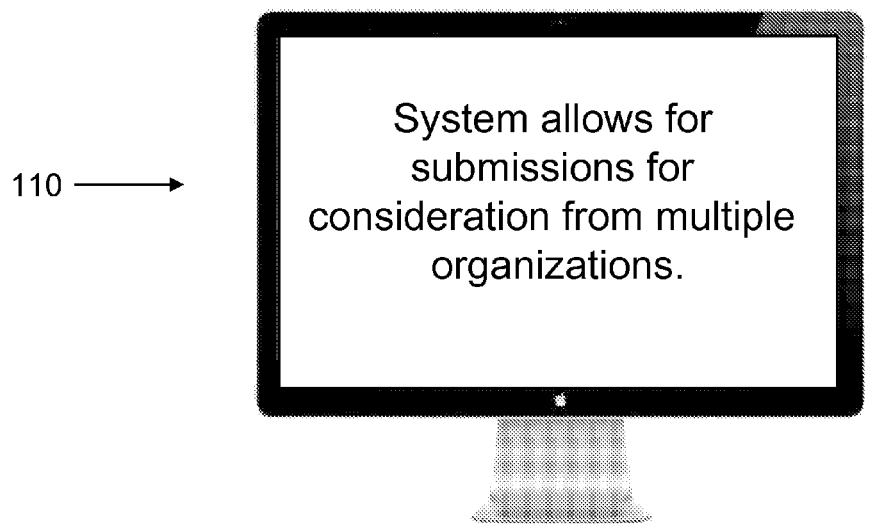
FIG. 11 is a fulfillment interface in which the submitting user receives the filtered music.

The submitting user then receives the music as shown in FIG. 11, in which the submitting user is notified via email, instant message, or phone and then receives only those approved and filtered music items that match their specific request. These submissions allow for the sharing of temporary demo tracks 110, and include a price to complete and produce the completed work 112.

Figure 12:
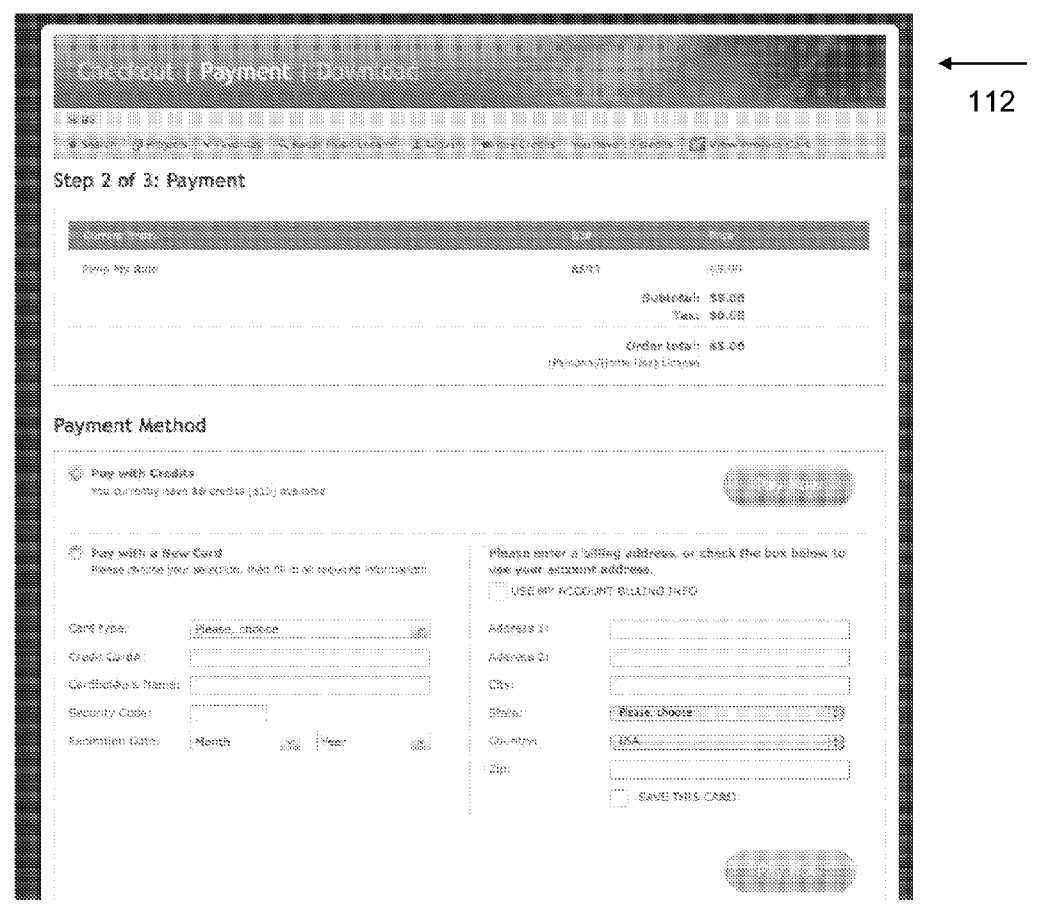

Finally, as shown in FIG. 12, they may immediately purchase/license the music that has been delivered to them via the system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A computer implemented method for automating the process of creating and fulfilling a request for licensable commercial content and for providing for automating the process of creating and fulfilling a request for licensable commercial content, said method comprising the steps:
   a. launching a request for digital media from within an audio or video editing application within a web browser;
   b. searching and playing responses to said request;
   c. selecting a specific commercial use license of said responses;
   d. purchasing said commercial use license within said launched web browser;
   e. exporting a purchased file directly into the audio or video editing application;
   f. placing a request via a user filling out an on-line form with a detailed description of the music they are looking for, including the type of usage, and how feedback is to be obtained;
   g. confirming to the user that their request has been received;
   h. notifying the systems administration the request has been submitted;
   i. approving said request;
   j. notifying groups of composers, record labels, publishers, and artists of the particulars of said request; and
   k. receiving submissions to said specific request from record labels, publishing companies, independent artists and composers that submit music to the specific request through a web portal;

wherein said licensable commercial content is selected from the group consisting of: music; sound effects; film footage; still photographs; and other images.

2. The method of claim 1, further comprising the further steps:
   a. sorting for the specific music request;
   b. filtering the music for relevancy; and
   c. approving or declining a submission.

3. The method of claim 2, comprising the further steps:
   a. notifying a submitting user via email, instant message, or phone of only those approved and filtered music items that match their specific request.

4. The method of claim 1, wherein said launching a request for digital media further comprises launching from an audio or video editing application or from a private label branded web browser launched from said audio or video editing application from a first menu.

5. The method of claim 1, wherein said exporting a purchased file comprises exporting a purchased file directly into said audio or video editing application and inserting the selected digital media automatically into a selected destination such as to integrate within the creative workflow of the user.

6. The method of claim 1, wherein said launching a request for digital media comprises an automated process of creating and fulfilling a request for licensable music comprising:
   a. Placing the request through said audio or video editing application;
   b. Broadcasting said request through a network of preselected supplier of commercial music; and
   c. Processing and filtering the responses received to match those tracks most closely meeting the request to allow for review and ultimately commercial licensing.

7. The method of claim 1, wherein said method is capable of being launched from within a hardware based local software audio or video edit application and return obtained, screened and managed audio files directly into the workflow of the user platform.

* * * * *